United States Patent Office 2,695,266
Patented Nov. 23, 1954

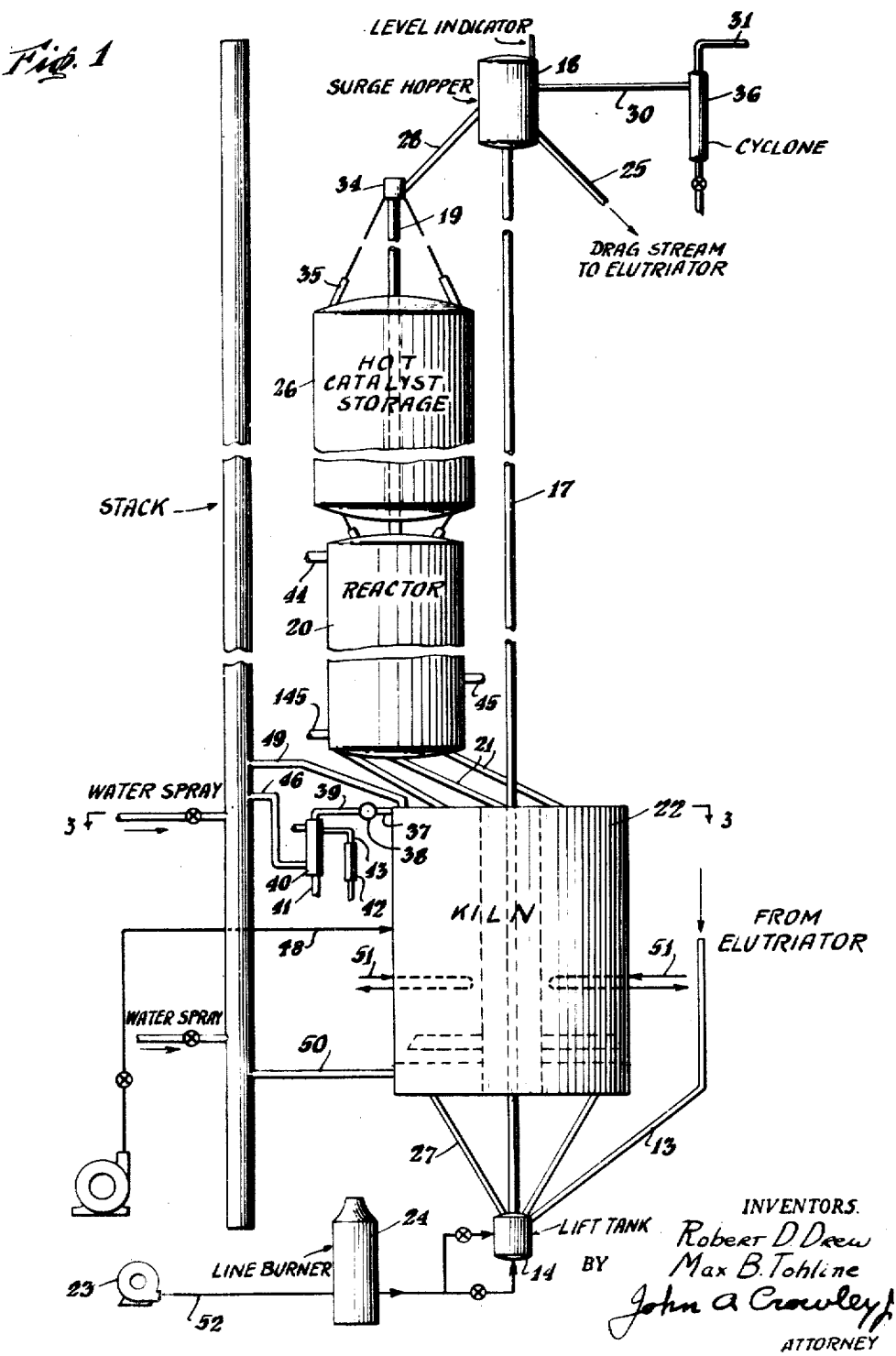

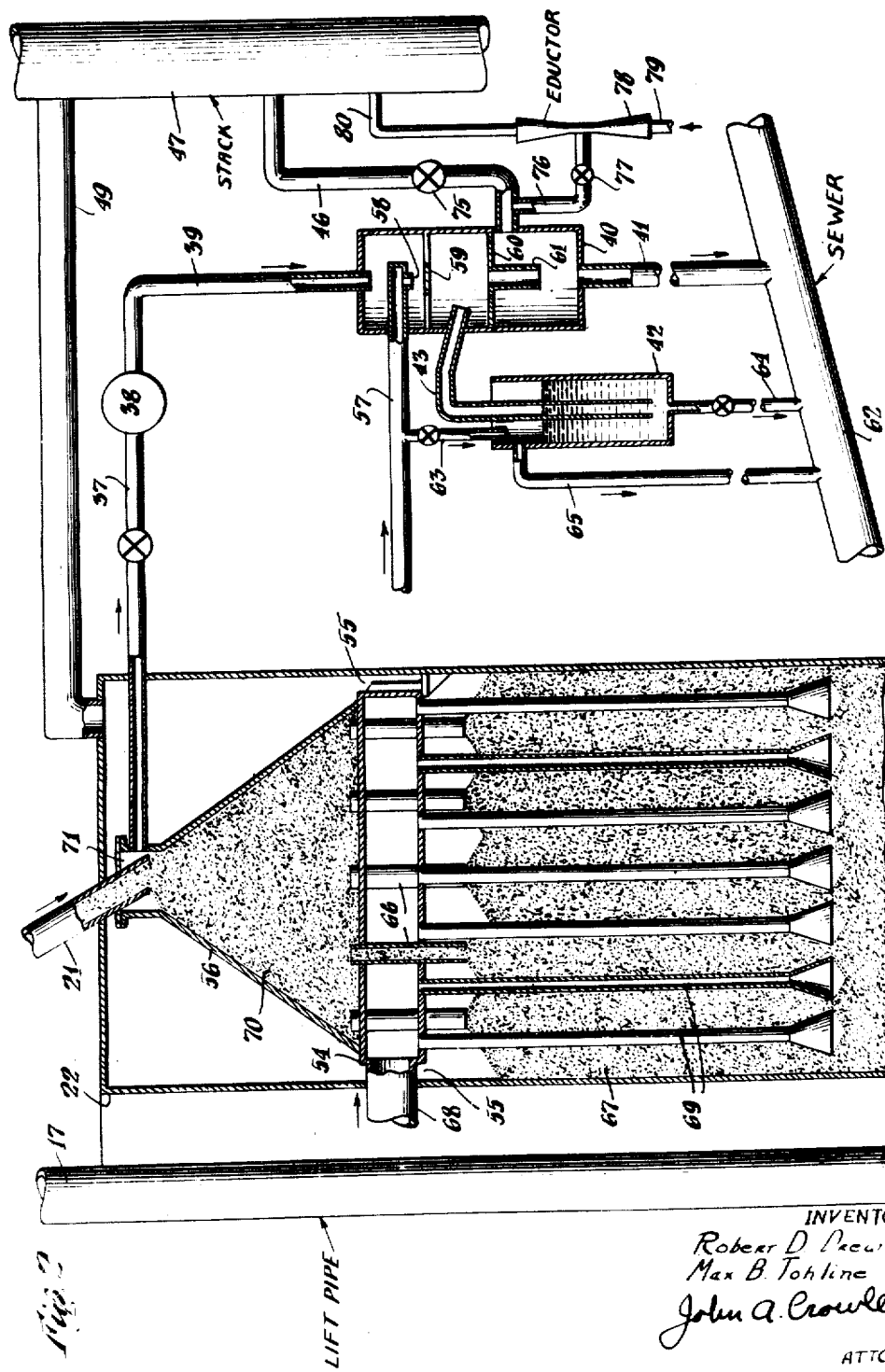

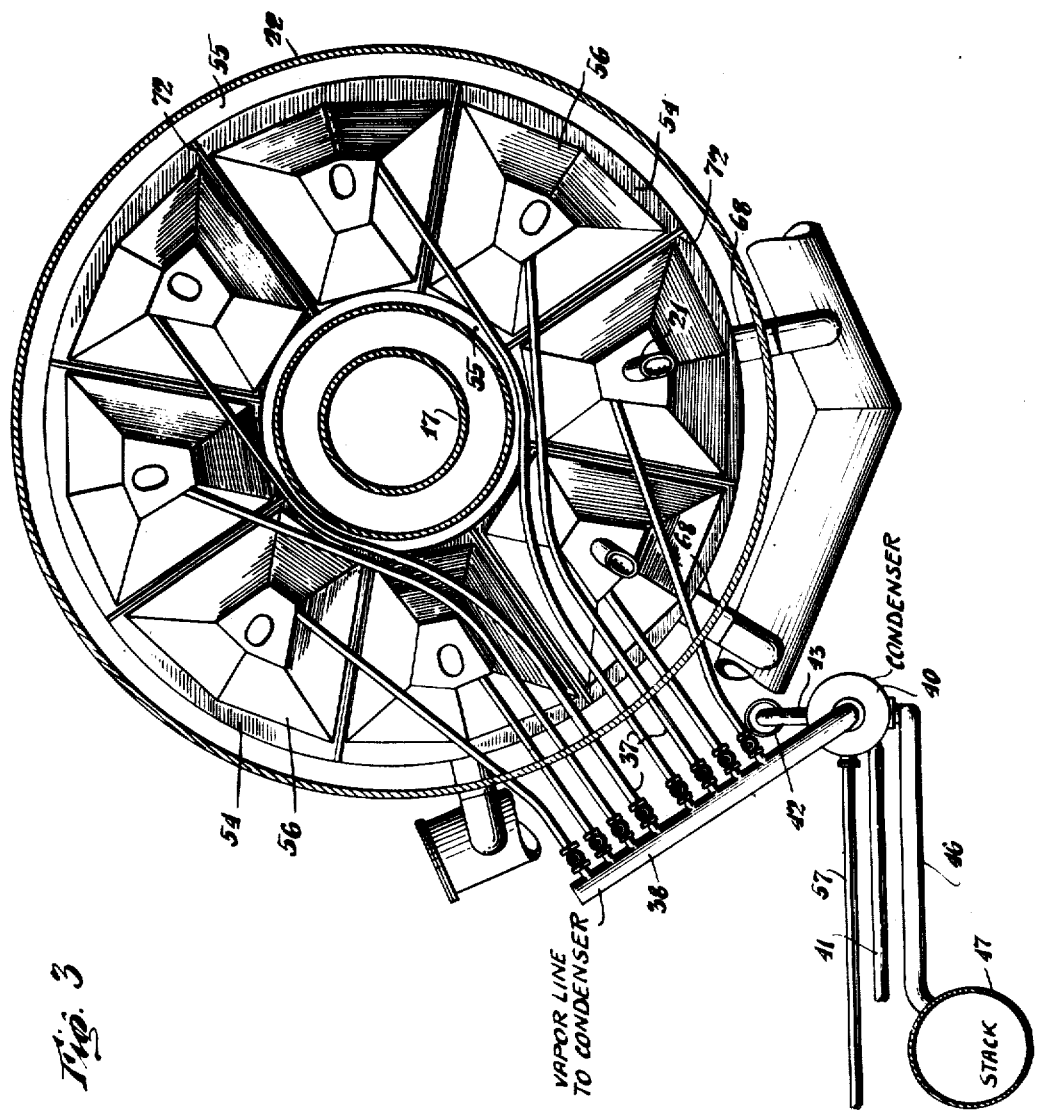

2,695,266

METHOD AND APPARATUS FOR THE REGENERATION OF GRANULAR CONTACT MATERIAL

Robert D. Drew, Wenonah, N. J., and Max B. Tohline, Beaumont, Tex., assignors to Socony-Vacuum Oil Company, Incorporated, New York, N. Y., a corporation of New York Application January 9, 1952, Serial No. 265,628

11 Claims. (Cl. 196—52)

This invention relates to improvements in the method and apparatus for the continuous conversion of high boiling hydrocarbons to lower boiling hydrocarbons in the presence of a granular contact material. It is particularly concerned with improvements in the contact material regeneration system of such processes.

Typical of processes to which this invention applies is the catalytic conversion of high boiling hydrocarbons to lower boiling hydrocarbons wherein a granular, adsorbent, catalytic contact material is passed cyclically through successive zones or vessels in the first of which it is contacted with a high boiling hydrocarbon charge at temperatures of 850° F. and upward to effect the conversion of said charge to lower boiling hydrocarbons which may contain large percentages of gasoline, and in the second of which contaminants deposited on the contact material are removed so that the contact material will be in a suitable condition for reuse in the conversion zone. Other exemplary processes are the thermal visbreaking, coking or cracking of hydrocarbon charge by contact with heated granular inert contact materials.

In processes wherein the contact material is catalytic in nature it may partake of the nature of natural or synthetic clays, bauxite, activated alumina or synthetic associations of silica, alumina or silica and alumina to which other substances, such as certain metallic oxides, may be added in small amounts. When the contact material is inert in character it may partake of the form of refractory materials such as mullite or it may partake of the form of stones or metallic particles or balls or particles of coke.

The contact material should be of palpable particulate form as distinguished from finely divided powders and the term "granular" as used herein should be understood to include any contact material of this form. The contact material may take the shape of pellets, tablets, spheres, capsules or particles of irregular shape such as are obtained from grinding and screening operations. Generally the contact material granules should be within the range 3 to 100 mesh and preferably within the range 4 to 20 mesh by Tyler Standard Screen Analysis.

In processes of the above-mentioned types, the cracking of the high boiling hydrocarbons to lower boiling hydrocarbons results in the deposition of carbonaceous or more properly hydro-carbonaceous contaminants on the contact material. These hydrocarbonaceous contaminants consist principally of compounds of hydrogen and carbon, sometimes with impurities such as sulfur and nitrogen, etc. compounds present. Often at least a portion of the deposit may comprise tarry or heavy oily hydrocarbon material or heavy organic material. These carbonaceous contaminants must be removed before the contact material can be reused for conversion. The usual method of removal is by burning these contaminants off with an oxygen-containing gas, such as air, the oxygen-containing gas being converted to flue gas. During the transfer of the contact material to the regeneration chamber a portion of the contaminant deposit, usually the heavy hydrocarbon portion, may be converted to lower boiling combustible material or hydrocarbons which are vaporized under the existing operation temperatures. These materials vaporize either during transfer of the contact material to the regeneration vessel or while the material remains in a supply bed above the regeneration zone proper. This vaporized organic or hydrocarbon material disengages from the supply bed in the top of the regenerator and mixes with the effluent flue gas therein and passes from the regenerator with the flue gas into the atmosphere, generally through a stack. In addition to conversion of the hydrocarbonaceous deposit, combustible vapors may be carried into the regeneration zone in the voids between contact material particles where the purging of the contact material as it leaves the conversion zone is not adequate. Also vapors may exist in the pores of the contact material which will expand under the lower pressure of the regeneration zone. A further source of combustible vapors is from liquid material in the contact material which vaporizes under the reduced pressure of the regeneration zone. While the actual amount of oil lost from the system in this manner is small, the avoidance of such loss is highly desirable. More efficient purging of the contact material with inert gas as it leaves the conversion zone, is not a complete answer to this problem since purging only removes the vaporized material in the void spaces between contact material particles and will not remove those portions of the contaminant deposit which may be converted during transfer to the regeneration zone, any vapors in the pores of the contact material, or liquid hydrocarbons in the contact material.

A major object of this invention is to provide a method and apparatus for the continuous conversion of high boiling hydrocarbons to lower boiling hydrocarbons which overcomes the above-described difficulties.

Another object of this invention is to provide in a continuous conversion system wherein the catalyst is passed cyclically through conversion and regeneration zones a method for preventing loss from the system of vaporizable hydrocarbons associated with the used contact material to be supplied to the regeneration zone.

These and other objects will be apparent from the following description of the invention and the drawings attached hereto.

This invention discloses a method and apparatus for the regeneration of used granular contact material wherein the used contact material is supplied to a bed of contact material in a confined supply zone bearing a carbonaceous deposit and having combustible vapors associated therewith. The combustible vapors, mainly hydrocarbons, are withdrawn from the supply zone under a pressure below the pressure in the supply zone and a major portion thereof condensed in a confined condensing zone. A preferred method of effecting this lower pressure is to utilize cold water to condense the vapors and any other condensible gases which may be flowing with the vapor stream. The condensed vapors are withdrawn from the condensing zone and may be disposed of in any suitable fashion. Any non-condensed vapors are passed to a stack. The used contact material gravitates from the supply zone into the upper section of a confined regeneration zone and passes therethrough as a substantially compact column. An oxygen-containing gas, such as air, is passed through this column under conditions suitable for the burning of the remaining hydrocarbonaceous contaminants on the contact material.

This invention will be best understood by reference to the attached drawings of which, Figure 1 is an elevational view showing the application of this invention to a typical catalytic cracking process, Figure 2 is an elevational view, partially in section, of one half of the upper section of the regenerator of Figure 1, and, Figure 3 is a sectional view taken along line 3—3' of Figure 1.

All of these drawings are diagrammatic in form and like parts in all the drawings bear like numerals.

Turning to Figure 1, there is shown a reactor 20 with a storage bin 26 thereabove. Beneath reactor 20 is regenerator 22, the upper section of which connects to the bottom of reactor 20 by means of conduits 21. Regenerator 22 is of annular cross-sectional shape. Beneath regenerator 22 is lift tank 14 which is connected to the bottom of regenerator 22 by conduits 27. Lift pipe 17 extends upwardly from tank 14 through the central opening in regenerator 22 to hopper 18 at a level above storage bin 26. Conduit 28 extends from hopper 18 to a flow box 34 and conduit 19 connects the flow box with the upper section of reactor 20. Flow box 34 also connects to the top of storage bin 26 by means of pipes 35. A cyclone 36 is connected to hopper 18 by conduit 30. A plurality of conduits 37 extended from the upper section of regenerator 22 to a manifold 38 and a conduit 39 extends from the manifold to the top of a condensing chamber 40. A withdrawal conduit 41 extends from the bottom of 40. An overflow chamber 42 is provided next to chamber 40 and connects thereto by conduit 43.

In operation granular contact material gravitates from hopper 18 into the upper section of reactor 20 by means of conduits 28 and 19. In normal operation conduit 19 is open while conduits 35 are closed off, chamber 26 being only used for emergencies. The contact material passes through reactor 20 as a substantially compact column. Hydrocarbon charge is supplied to reaction zone 20 by means of conduit 44. This charge may consist of a petroleum gas oil or a high boiling residual stock and may be introduced in vaporized, mixed phase or liquid condition. Where the charge is a residual stock at least a portion of the charge usually must be introduced as a liquid and this invention is particularly applicable to processes employing charge stocks of this type. The charge passes through the column of contact material and is converted at a temperature of the order of 750–1100° F. to lower boiling products which are removed through conduit 45. The conversion process deposits hydrocarbonaceous contaminants or organic contaminants, mainly heavy hydrocarbons, on the contact material. The contact material is subjected to purging by steam, flue gas or other suitable inert stripping gas supplied to the reactor via pipe 14S. By purging the catalyst most of the vaporized hydrocarbons are removed therefrom but some hydrocarbon material of high boiling point remains deposited on the used contact material or exists as a liquid thereon or a vapor in the pores of the contact material discharging from the reactor via conduits 21. The used contact material still existing at a temperature sufficiently high for the initiation of contaminant combustion, i. e., at least about 700° F. passes into a supply accumulation thereof in the upper section of regenerator 22. The contact material passing to the supply bed may contain vapors or material which vaporizes under the conditions within the supply zone. Frequently, the vapors result from conversion of a portion of the hydrocarbonaceous contaminant to lower boiling combustible organic or hydrocarbon materials which are vaporized under the conditions en route to or within the supply zone 70. These conditions usually involve temperatures within the range about 700–1000° F., and pressures within the range 10 pounds per square inch gage to a reduced pressure of about 5 pounds absolute. The expression "containing hydrocarbonaceous contaminant deposits, a portion of which are vaporizable" is used broadly herein to include both contact material which may have combustible vapors in its pores and a non-vaporizable contaminant deposited thereon and contact material having a liquid or solid deposit which is capable of vaporization under the conditions above described or will be converted to vaporizable material during passage to the regeneration zone. The vaporized hydrocarbons or other combustible vapors are withdrawn from the regenerator 22 through conduits 37 and passed to condensing zone 40 through manifold 38 and conduit 39 wherein combustible organic material is condensed. The liquid organic matter is withdrawn from zone 40 through passage 41. Non-condensed material passes from zone 40 through passage 46 to a stack 47. The used contact material passes into a regeneration zone in the lower section of vessel 22 wherein carbonaceous contaminants are burned off by means of an oxygen-containing gas such as air. The oxygen-containing gas is supplied through line 48 to an intermediate level in the regeneration zone and passes upwardly through the upper portion of a compact bed of contact material maintained therein and downwardly through the lower portion of the bed. Flue gas passes to stack 47 from vessel 22 through conduit 49 at the upper end of the vessel 22 and conduit 50 at the lower end. The contact material is maintained in the regeneration zone at a temperature below the temperature at which the contact material will be permanently damaged by means of a cooling fluid circulated through cooling coils 51. Regenerated contact material is removed from the regeneration zone and passes to lift tank 14 by means of passages 27. Heated air, steam or other suitable gas is forced into tank 14 by compressor 23. The gas is heated in line heater 24. Contact material is caused to be supported in the gas stream as it enters the lower end of lift pipe 17. The contact material is lifted into the separator 18 where it is permitted to settle onto a supply accumulation thereof. The separated lift gas passes via pipe 30 to cyclone separator 36 in which any entrained contact material is separated prior to discharge of the lift gas via conduit 31. The contact material returns to a gravity feed leg 19 via pipe 28 and flows through the feed leg into the reactor 20. The spent catalyst flows via pipes 21 into the upper section of the kiln 22.

Figure 2 illustrates in more detail the system for removing the objectionable combustible organic material from the contact material and also gives details of the upper section of the regeneration vessel 22. An air duct 54 of less lateral dimensions than vessel 22 is positioned centrally within the upper section of vessel 22 so as to form passages 55 on each side of the duct. On top of duct 54 within the upper section of vessel 22 is an enclosed frusto-pyramidal or frusto-conical supply chamber 56. Contact material supply conduit 21 extends into the upper section of chamber 56 to a level below the top of the chamber. A gaseous material conduit 37 extends from chamber 56 at a level below the lower end of conduit 21. This conduit 37 connects into a manifold 38 and conduit 39 extends from manifold 38 into the upper section of condensing chamber 40. A cold water pipe 57 extends laterally into chamber 40 at a level below the lower end of conduit 39 and has a downwardly pointed nozzle 58 therein. Nozzle 58 is disposed centrally with respect to chamber 40. A baffle plate 59, of lateral dimensions substantially less than chamber 40, is fixed directly below nozzle 58. A transverse partition 60 extends across chamber 40 at a level below baffle plate 59 but substantially above the bottom of vessel 40. Conduit 61 depends centrally downwardly from partition 60 to a level above the bottom of chamber 40. Conduit 46 with valve 75 thereon, extends from chamber 40 at a level intermediate partition 60 and the lower end of conduit 61 into stack 47, at a level above the top of chamber 40. Conduit 76, with valve 77 thereon, extends from conduit 46 before valve 75 and connects into an eductor 78. Eductor 78 has a steam inlet 79 and an outlet 80 which connects into stack 47. Withdrawal conduit 41 extends from the lower section of chamber 40 into sewer 62. Overflow chamber 42 is positioned next to chamber 40 and overflow conduit 43 extends from chamber 40 at a level intermediate baffle 59 and partition 60 downwardly into the lower section of chamber 42. A water charge pipe 63 extends into the upper section of chamber 42 from conduit 57 and a water removal pipe 64 extends from the bottom of chamber 42 into sewer 62. Overflow pipe 65 connects the upper section of 42 with sewer 62. Returning to regeneration vessel 22 a plurality of seal conduits 66 extend from the lower section of supply chamber 56 into the upper section of regeneration chamber 67 which lies in the lower section of vessel 22 beneath duct 54. The total horizontal cross-sectional area of conduits 66 is only a small fraction of the horizontal cross-section of the lower section of supply chamber 56. Also, supply chamber 56 is enclosed out of communication with the remainder of vessel 22 except through conduits 66. The length of conduits 66 should be sufficient to provide a compact stream of contact material adequate for preventing the escape of any excess amount of gases from regeneration chamber therebelow. An air conduit 68 connects into duct 54 and a plurality of conduits 69 depend downwardly from duct 54 to an intermediate level in regeneration zone 67.

When the gaseous pressure in supply zone 56 is sufficiently high, condensing zone 40 is operated at atmospheric pressure. Valve 75 is kept open while valve 77 is closed. The stream of used contact material from the reaction zone is passed into confined supply zone 56. Normally inert purge gas, such as steam, enters with the contact material. The contact material stream is discharged into the surface of a bed of contact material 70 within the supply zone. The sides of zone 56 preferably make an angle with the horizontal greater than the normal angle of repose of the contact material. By this means segregation of the contact material according to particle size as it enters the supply zone is prevented, since, if the bed therein were allowed to assume its normal angle of repose, the larger particles would tend to accumulate toward the outer portions of the bed and the smaller particles would accumulate near the center. This would lead to channelling of the gas flow in the regeneration zone. The normal angle of repose usually is within the range about 25 to 40 degrees with the horizontal. As previously indicated, combustible vapors are associated with the contact material in supply bed 70. These vapors consist principally of condensable and non-condensable hydrocarbons. Since passage 21 extends into chamber 56 to a level below the top of the chamber a gas space 71 is formed above the bed. A stream of the vaporized material plus purge gas from the reaction zone is withdrawn from this gas space through passage 37, manifold 38 and passage 39 into the upper section of barometric condensing zone 40 under a pressure below the gaseous pressure in zone 56. This lower pressure is effected by condensing a major portion of the condensable vapors in zone 40 by means of a high velocity stream of cold water passed downwardly through condensing zone 40. The water is introduced to zone 40 through passage 57 and nozzle 58. The purge gas, as well as condensable hydrocarbons which enter zone 40 through passage 39, may be condensed by this stream of water. Baffle 59 acts to disperse the stream of water and provide for efficient condensation. Liquid organic material and water are passed into the lower section of zone 40 through passage 61 and then to sewer 62 through passage 41 from which the organic material may be discarded in any conventional manner. Alternatively the condensed organic material, which will normally be hydrocarbon material, may be recovered and returned to the reaction zone. Normally gaseous hydrocarbons and sometimes flue gas which has been sucked into zone 56 passes through passage 46 to stack 47. If passages 61 or 41 were to plug up water might fill zone 40 and back up into zone 56 thereby interrupting the operation of the regenerator and possibly causing damage to the regenerator and to the contact material. To avoid this, overflow passage 43 is provided to remove any excess quantity of liquid. This passage extends to the lower section of overflow zone 42. The overflow water then passes to the sewer 62 through passage 65 or, in the event of unusually large amounts of excess water, through passage 64. Passage 64 may be eliminated if desired and large amounts of overflow water allowed to discharge over the open top of zone 42. A column of water is maintained in overflow zone 42 sufficiently high to cover the bottom of passage 43 at the operating pressure in zone 40. This prevents any escape of gaseous material from zone 40 through passage 43 during normal periods of operation. For this purpose water is continuously added through pipe 63 and withdrawn through pipe 65. Returning to supply zone 56, used contact material passes from the lower section of zone 56 and bed 70 into the upper section of regeneration zone 67 as a plurality of substantially compact seal streams or legs 66 whose total horizontal cross-sectional area is small relative to that of the lower section of the supply bed. The supply bed is maintained out of communication with regeneration zone 67 except through seal legs 66. The contact material passes through zone 67 as a substantially compact column. Air is introduced to duct 54 through passage 68 and a plurality of streams of air pass to a centrally located level in the contact material column from duct 54 through passages 69. The air passes upwardly through the upper portion of bed 67 to burn a portion of the carbonaceous contaminants from the contact material. Flue gas passes upwardly from the column of contact material through passages 55 to the upper section of vessel 22 above supply zone 56 and is withdrawn through passage 49 to stack 47. Air also passes downwardly through the lower portion of bed 67 to burn the remainder of the carbonaceous contaminants from the contact material. The regenerated contact material may then be returned to the reaction zone.

This system may also be operated so that condensing zone 40 is maintained under a vacuum. For this operation valve 75 is closed and valve 77 opened. Combustible vapors, mainly hydrocarbons, and purge gas from the reaction zone are sucked from bed 70 by the vacuum in zone 40 through passages 37 and 39 into zone 40. The vacuum is effected by condensation of the vapors and purge gas, if it is condensable, by the high velocity water stream from nozzle 58. The liquids pass out through passage 41. Any non-condensed vapors or other gaseous material is drawn from zone 40 through passage 76 into eductor 78 through which a high velocity stream of steam is passing. Steam is admitted through passage 79 and steam and gaseous material are discharged into stack 47 through passage 80. A suitable hot well (not shown) should be provided on conduit 41 at a position suitable to prevent atmospheric air from entering condenser 40 when it is operated under vacuum. This hot well may be of conventional design and is positioned on 41 at a level sufficient to provide a column of water in 41 between the hot well and the condenser of a height equal roughly to the atmospheric pressure in feet of water. This column should be roughly 34 feet high at sea level. Conduit 41 extends into the bottom of the hot well below the surface of the water maintained therein. Water and condensed hydrocarbons pass from the upper section of the hot well into sewer 62. The hot well should be of a size suitable to hold enough water to provide the water column in 41. The water column in overflow zone 42 performs a like function in preventing atmospheric air from entering condensing zone 40 through passage 43. The remainder of the system operates as previously described.

Figure 3 shows in detail the application of the method and apparatus of Figure 2 to the regenerator of Figure 1. Shown in Figure 3 are a plurality of air ducts 54 spaced around annular shaped vessel 22 so that passages 55 are defined between the walls of the ducts and the walls of vessel 22. Passages 72 are defined between ducts 54. Resting on each duct is a frusto-pyramidal supply chamber or hood 56 with a contact material inlet conduit 21 through the top. Gaseous material passes from each of supply chambers 56 through passages 37 into manifold 38 and then into condenser 40 under a reduced pressure as described in connection with Figure 2.

The various parts of the apparatus of this invention may, of course, take different forms than that shown in the attached figures. For example the regeneration vessel 22 need not be annular in shape but may be of the form of a hollow cylinder or rectangular vessel. There need not be a plurality of supply vessels 56, only one supply vessel may be used. Also the supply vessel need not be of a frusto-pyramidal or frusto-conical form but may be of any other desired form. The pyramidal or conical form, however, is preferred because of the segregation problem previously mentioned. Various other means of withdrawing the combustible vapors under a reduced pressure from zone 56 may be used. For example a vacuum pump may be used having a condenser, either of the direct or indirect heat transfer type associated therewith. The air in the regeneration zone may be passed upwardly or downwardly through the entire column of contact material therein rather than passing a portion upwardly and a portion downwardly through the column as shown.

The temperature of the contact material in the regeneration zone should be controlled by cooling below the level at which the contact material is permanently damaged. Where the contact material is catalytic in nature the temperature in the regeneration zone should not exceed about 1400° F. Contact material should usually be maintained in the supply zone 56 at a temperature within the range about 700 to 1000° F. The pressure in chamber 56 should be higher than the pressure in condensing zone 40 and in stack 47. However, the former pressure need be only in excess of one inch of water over the latter for the operation of this invention. Preferably, the pressure in chamber 56 should be slightly lower than the pressure in the upper section of the regeneration chamber so that no combustible vapors will escape into the gas space above the contact material column of the regeneration through any cracks or openings in chamber 56. The temperature in condensing zone 40 should be less than about 200° F. and preferably less than 125° F. Conduits 66 should be of a length within the range of 0.5 to 6 feet and should have a total horizontal cross-sectional area about 2% to 10% of the horizontal cross-sectional area of the lower section of supply zone 56.

In one suitable apparatus built according to this invention, the regeneration vessel 22 was of annular cross-sectional shape, having an outside diameter of 27 feet 7 inches and an inside diameter of 8 feet 9 inches. The total height of the vessel was 18 feet 9 inches. The contact material column in the regeneration zone extended from a level 7 feet 10 inches from the top of the vessel to a level 5 feet 6 inches from the bottom of the vessel. A flue gas plenum chamber was provided below the column in the regeneration zone. There were 8 ducts 54 spaced around the vessel, the top of the ducts being 5 feet 6 inches from the top of the vessel. The ducts were 17 inches high. A supply chamber or hood in the shape of a frustrum of a five sided pyramid was provided on top of each duct. These supply chambers extended to a level 10½ inches from the top of the vessel. Contact material inlet conduits 21 were 8 inch pipes and extended into the supply chambers a distance of 6 inches. Gaseous material outlet pipes extended from the supply chamber at a level 2½ inches from the top of the supply chamber. These pipes were 3 inch pipes. All of the gaseous material pipes connected into a manifold in the form of a 10 inch pipe. This 10 inch pipe connected into the top of a condensing chamber which was a cylindrical vessel 2 feet 4 inches in diameter and 6 feet 8 inches high. Water inlet pipe 57 was a 4 inch pipe extending into the condensing vessel at a level 1 foot 2 inches from the top and had depending downwardly therefrom a 1½ inch nipple to act as a nozzle. Circular baffle plate 59 was 6 inches in diameter and 3 inches below the nipple. A transverse partition extended across the condensing vessel at a level 3 feet from the bottom of the vessel and a 10 inch pipe depended centrally from the partition to a level 1 foot from the bottom of the vessel. A 6 inch outlet conduit extended from the bottom of the condensing vessel. A 6 inch vent conduit extended from the condensing chamber at a level 2 feet 6 inches above the bottom thereof. An overflow vessel 10 inches in diameter and 3 feet 9 inches high was positioned from the condensing vessel at a level 4 feet 6 inches above the bottom into the top of the overflow vessel and downwardly to a level 3 inches above the bottom of the overflow vessel. A 1½ inch overflow pipe extended from the overflow vessel at a level 2 feet 9 inches above the bottom of the vessel. A ¾ inch water inlet and a 1 inch drain were provided at the top and bottom respectively of the overflow vessel.

A plurality of conduits for contact material extended downwardly from the bottom of each supply chamber to a level 12 inches below the bottom of each duct 54. A plurality of conduits of air depended downwardly from the duct to a level 6 feet 9 inches therebelow.

This system was used to regenerate a granular adsorbent catalyst containing carbonaceous contaminants and having undesirable gaseous organic material associated therewith. The catalyst was supplied to the supply chambers at a rate of 350 tons per hour. The pressure in the condensing chamber was reduced by passing a jet of 50 to 100 G. P. M. of cold water therethrough to condense the condensable vapors. Air was supplied to the ducts and then to the regeneration zone at the rate of 32,000 standard cubic feet per minute.

This invention should be understood to cover all changes and modifications of the examples of the invention herein chosen for purposes of disclosure which do not constitute departures from the spirit and scope of the invention.

What is claimed is:

1. A continuous process for regeneration of used granular contact material existing initially at a temperature within the range of 700–1000° F. and bearing a hydrocarbonaceous contaminant which becomes in part vaporized under the existing temperature conditions during passage of the contact material to the regeneration zone, which comprises: supplying said contact material onto a confined bed thereof above said regeneration zone, passing the contact material downwardly from the bottom of said bed as at least one confined substantially compact stream of contact material which discharges a substantial distance below said bed onto a substantially compact column of said contact material in the regeneration zone, said stream having a small horizontal cross-sectional area relative to that of said bed, said bed being maintained completely out of communication with gases from said regeneration zone except through said compact stream, withdrawing as a confined stream from said confined bed the portion of the contaminant which vaporizes during passage of the contact material to the regeneration zone, mixing said stream with a cooling liquid in a confined condensing zone to effect condensation of at least a portion of said vapors, whereby a vacuum is created sufficient to suck the vapors from said bed as aforesaid, passing an oxygen containing gas through the column in said regeneration zone to burn off the remaining portion of the contaminant deposit and withdrawing the resulting flue gas from said regeneration zone and withdrawing the regenerated contact material from the lower section of said regeneration zone.

2. In a continuous cyclic process for conversion of hydrocarbons wherein a granular contact material is passed cyclically through a conversion zone wherein it is contacted with a fluid hydrocarbon to effect conversion thereof to lower boiling hydrocarbons with resultant deposition of a hydrocarbonaceous contaminant on the contact material and through a regeneration zone wherein it is contacted with an oxygen containing gas to burn off the contaminant, and wherein a portion of the contaminant deposit becomes vaporized after the contact material has been discharged from the conversion zone and before it enters the regeneration zone the improvement which comprises: withdrawing the used contact material from the conversion zone still at a temperature suitable for initiating combustion of the contaminant deposit and delivering it into the upper end of a confined supply bed of said contact material above the regeneration zone, said supply bed being confined out of communication with the gases from said regeneration zone except through at least one compact seal leg extending downwardly from said bed to a column of the contact material in the regeneration zone, said seal leg being of substantially less horizontal cross sectional area than said bed, passing the contact material downwardly through said bed and through said seal leg to the regeneration zone, while a portion of said contaminant deposit becomes vaporized during the transfer of contact material from said conversion to said regeneration zone as aforesaid, withdrawing the resulting vaporized hydrocarbon material from said confined supply zone as a confined stream and discharging said stream into a barometric condensing zone, mixing said stream with a suitable cooling liquid in said condensing zone to effect condensation of at least a substantial portion of the vaporized material, whereby a reduced pressure is maintained on said bed in said confined supply zone, passing an oxygen containing gas through the column of contact material in said regeneration zone to burn the remainder of the contaminant deposit and withdrawing the flue gas resulting from said combustion from the regeneration zone separately of said vaporized portion of the contaminant deposit.

3. A continuous process for the regeneration of used granular contact material which is supplied to a bed thereof in a confined supply zone, said contact material in said bed containing a hydrocarbonaceous deposit and also having hydrocarbon vapors associated therewith which comprises: passing contact material downwardly from the bottom of said bed as at least one confined substantially compact stream of contact material which discharges a substantial distance below said bed onto a substantially compact column of said contact material in a confined regeneration zone therebelow, said stream having a small horizontal cross-sectional area relative to that of said bed and said bed being maintained completely out of communication with gases from said regeneration zone except through said compact stream, passing an oxygen-containing gas through said contact material column to burn off the hydrocarbonaceous contaminant on the contact material, passing flue gas from the regeneration zone to a disposal stack, removing regenerated contact material from the lower section of said regeneration zone, maintaining the pressure in said supply zone at a level above the pressure in said stack and slightly below the pressure in said regeneration zone, removing hydrocarbon vapors from said bed in said supply zone at a pressure below the pressure in said supply zone but above the pressure in said stack, condensing at least a major portion of said vapors in a confined condensing zone, removing condensed vapors from the condensing zone and passing any non-condensed gases from the condensing zone to the stack.

4. A continuous process for the regeneration of used granular contact material existing initially at a temperature within the range about 700° F. to 1000° F. and bearing a hydrocarbonaceous contaminant which is partly vaporized under the existing temperature conditions during passage of the contact material to the regeneration zone, which comprises: maintaining a substantially compact bed of used granular contact material within a confined supply zone above said regeneration zone, supplying the used contact material bearing the hydrocarbonaceous contaminant to said bed, maintaining a gas space above said bed in said supply zone, passing contact material downwardly from the lower section of said bed as a plurality of confined substantially compact seal streams which discharge a substantial distance below said bed onto a substantially compact column of contact material in the regeneration zone, said plurality of streams having a total horizontal cross-sectional area only a small fraction of the horizontal cross-sectional area the lower section of said bed and said bed being maintained completely out of communication with gases from said regeneration zone except through said plurality of seal streams, withdrawing as a confined stream from said gas space the portion of the contaminants which vaporizes during passage of the contact material to the regeneration zone, passing said last-named stream into contact with downwardly moving high velocity stream of cold water in a confined condensing zone to effect condensation of at least a major portion of said vapors whereby a vacuum is created sufficient to suck the vapors from said bed into said gas space and into said condensing zone, removing water and condensed vapors from the lower section of said condensing zone, removing noncondensed vapors from the condensing zone, separately of the water and condensed vapors, passing any excess liquid from the condensing zone through a confined passage extending into the upper section of a confined overflow zone and discharging in the lower section of said overflow zone, maintaining a column of water in said overflow zone sufficient to cover the lower end of said last-named passage at the operating pressure in said condensing zone, supplying water to the top of said water column, removing water from the bottom of said water column, passing contact material downwardly through said regeneration zone as a substantially compact column, passing air through said column of contact material to burn off the contaminants remaining on said contact material, removing regenerated contact material from the lower section of said regeneration zone, and removing flue gas from the regeneration zone.

5. In a continuous cyclic process for the conversion of hydrocarbons wherein a granular contact material is passed cyclically through a conversion zone wherein it is contacted with a fluid hydrocarbon to effect conversion thereof to lower boiling hydrocarbons with resultant deposition of a hydrocarbonaceous contaminant on the contact material and through a regeneration zone wherein the contact material is contacted with an oxygen-containing gas to burn off the contaminant and wherein a portion of the contaminant becomes vaporized after the contact material has been discharged from the conversion zone and before it enters the regeneration zone the improvement which comprises: withdrawing the used contact material from the conversion zone still at a temperature suitable for initiating combustion of the contaminant deposit, delivering said contact material to a plurality of confined supply beds above the regeneration zone, said supply beds being confined out of communication with the gases from said regeneration zone except through a plurality of compact seal legs extending from each of said beds to a substantially compact column of the contact material in the regeneration zone, the total horizontal cross-sectional area of said seal legs from each of said beds being of substantially less horizontal cross-sectional area than the lower section of said bed, passing the contact material downwardly through said plurality of beds and through said plurality of seal legs to the regeneration zone while a portion of said contaminant deposit becomes vaporized during the transfer of contact material from said conversion zone to said regeneration zone as aforesaid, withdrawing resulting vaporized hydrocarbon material as a confined stream from each of said supply beds combining said last-named streams into a single confined stream of gaseous material and discharging said stream into a barometric condensing zone, mixing said last-named stream with a high velocity stream of cold water in said condensing zone to effect condensation of at least a substantial portion of the vaporized material whereby a reduced pressure is maintained in said plurality of supply beds, passing an oxygen-containing gas through the column of contact material in said regeneration zone to burn off the remainder of the contaminant deposit and withdrawing the flue gas resulting from said burning from the regeneration zone separately of said vaporized portion of the contaminant deposit.

6. An apparatus for the regeneration of used granular contact material having hydrocarbonaceous contaminants deposited thereon, a portion of which are vaporizable under the temperature and pressure conditions of the contact material as it is supplied to the regeneration chamber which comprises in combination: an enclosed supply chamber above the regeneration chamber adapted to contain a substantially compact bed of used granular contact material, means for supplying used contact material to said supply chamber at an elevated temperature suitable for the initiation of contaminant combustion, a conduit for the flow of vaporized hydrocarbonaceous contaminants extending from said supply chamber into an enclosed condensing chamber, means for reducing the pressure in said conduit below the pressure in said supply chamber, means for condensing at least a major portion of said vaporized contaminants in said condensing chamber, means defining at least one passageway for contact material flow from said supply chamber into said regeneration chamber therebelow, means for introducing an oxygen-containing gas into said regeneration chamber, means for removing flue gas from said regeneration chamber and means for removing regenerated contact material from the lower section of said regeneration chamber.

7. An apparatus for the continuous regeneration of used granular contact material existing at a temperature within the range about 700° F. to 1000° F. and bearing a hydrocarbonaceous contaminant which becomes in part vaporized under the existing temperature conditions during passage of contact material to the regeneration chamber which comprises in combination: an enclosed regeneration chamber, an enclosed supply chamber above said regeneration chamber adapted to contain a substantially compact bed of used contact material, at least one conduit for the passage of contact material extending from the lower section of said supply chamber into said regeneration chamber, said conduit having a small horizontal cross-sectional area relative to that of the lower section of said supply chamber and said regeneration chamber being completely out of communication with said supply chamber except through said conduit, a conduit for the supply of used contact material extending into the upper section of said supply chamber, a conduit for the flow of vaporized hydrocarbonaceous contaminants extending from the upper section of said supply chamber into the upper section of an enclosed condensing chamber, a cold water supply pipe extending into said condensing chamber at a level below said gaseous material conduit, a downwardly pointing nozzle in said cold water supply pipe, a withdrawal conduit extending from the bottom of said condensing chamber, means for introducing an oxygen-containing gas into said regeneration chamber, means for removing flue gas from said regeneration chamber and means for removing contact material from the lower section of said regeneration chamber.

8. In a continuous cyclic system for the conversion of hydrocarbons wherein a granular contact material is passed cyclically through a conversion chamber wherein it is contacted with a fluid hydrocarbon to effect conversion thereof to lower boiling hydrocarbons with resultant deposition of a hydrocarbonaceous contaminant on the contact material and through a regeneration chamber wherein it is contacted with an oxygen-containing gas to burn off the contaminant and wherein a portion of the contaminant deposit becomes vaporized after the contact material has been discharged from the conversion chamber and before it enters the regeneration chamber the improvement which comprises in combination: maintaining an enclosed supply chamber above said regeneration chamber, said supply chamber being out of communication with said regeneration chamber except through at least one seal conduit extending from the lower section of said supply chamber into said regeneration chamber, said seal conduit being long enough to confine a substantially compact column of contact material adequate to prevent any substantial transfer of gases from the regeneration chamber through said conduit and said seal conduit being of substantially less horizontal cross-sectional area than the lower section of said supply chamber, a conduit for the transfer of used contact material to said supply chamber from said conversion chamber extending into the upper section of said supply chamber and terminating at a level below the top of said supply chamber, a conduit for the flow of vaporized hydrocarbonaceous contaminants extending from the upper section of said supply chamber at a level above the lower end of said contact material supply conduit into the upper section of an enclosed condensing chamber, a pipe for cold water extending into the upper section of said condensing chamber at a level below the lower end of said last named conduit, a downwardly pointing nozzle depending from said pipe, a baffle plate beneath said nozzle, a conduit for gaseous material extending from the lower section of said condensing chamber, a liquid withdrawal conduit extending from the bottom of said condensing chamber, an overflow conduit extending from the upper section of said condensing chamber into an overflow chamber and terminating adjacent to the bottom of the overflow chamber, a water charge pipe extending into the upper section of said overflow chamber, a water withdrawal pipe extending from the bottom of said overflow chamber, means for introducing air into said regeneration chamber to burn off the remaining contaminants on said contact material, means for removing flue gas from said regeneration chamber and means for removing contact material from the lower section of said regeneration chamber.

9. An apparatus for the continuous regeneration of used granular contact material existing initially at a temperature within the range about 700° F. to 1000° F. and bearing a hydrocarbonaceous contaminant which is partly vaporized under the existing temperature conditions during passage of the contact material to the regeneration chamber which comprises in combination: an enclosed regeneration vessel, an air duct of less lateral dimensions than said vessel positioned centrally within the upper section of said regeneration vessel, an enclosed supply chamber for granular contact material on top of said duct within said vessel, the walls of said supply chamber making an angle with the horizontal within the range about 25 to 40 degrees, a plurality of conduits for contact material extending downwardly from the lower section of said supply chamber through said duct and into a regeneration chamber therebelow in said regeneration vessel, said plurality of conduits having a total horizontal cross-sectional area only a small fraction of the horizontal cross-sectional area of the lower section of said supply chamber and said supply chamber being enclosed out of communication with the remainder of said regeneration vessel except through said plurality of conduits, a contact material supply conduit extending into the top of said supply chamber to a level substantially below the top of said supply chamber, a conduit for the flow of gaseous material extending from said supply chamber at a level above the lower end of said supply conduit into the upper section of an enclosed condensing chamber situated exterior to said regeneration vessel, a cold water pipe extending laterally into said condensing chamber at a level below the lower end of said last named conduit, a downwardly pointing nozzle in said pipe disposed centrally with respect to said condensing chamber, a baffle plate of lateral dimensions substantially less than said condensing chamber fixed directly below said nozzle, a transverse partition extending across said condensing chamber at a level substantially below said baffle plate but substantially above the bottom of said condensing chamber, a conduit depending downwardly from said partition to a level above the bottom of said condensing chamber, a conduit for gaseous material extending from said condensing chamber at a level intermediate said partition and the lower end of said last-named conduit and into a discharge stack at a level above the top of said condensing chamber, an overflow pipe extending from said condensing chamber at a level intermediate said baffle plate and said partition downwardly into the lower section of an overflow vessel, a water charge pipe extending into the top of said overflow vessel, a water removal pipe extending from the bottom of said overflow vessel, means for removing excess liquid from said overflow vessel, a withdrawal conduit extending from the bottom of said condensing chamber, a conduit for the supply of air to said air duct, a plurality of conduits for the flow of air depending downwardly from said air duct to a level intermediate said air duct and the bottom of said regeneration vessel, a flue gas conduit extending from the upper section of said regeneration vessel at a level above said duct into said stack, a conduit for flue gas extending from the lower section of said regeneration vessel into said stack, and a conduit for the removal of contact material extending from the lower section of said regeneration vessel.

10. An apparatus for the continuous regeneration of used granular contact material having hydrocarbonaceous contaminants deposited thereon, a portion of which are vaporizable under the temperature and pressure conditions of the contact material as it is supplied to the regeneration chamber which comprises in combination: a plurality of enclosed supply chambers each adapted to confine a substantially compact bed of granular contact material above said regeneration chamber, a conduit for the supply of contact material passing into the upper section of each supply chamber and terminating therein at a level below the top of said supply chamber, a conduit for gaseous material extending from each of said supply chambers at a level above the lower end of said contact material supply conduit, all of said last named conduits terminating in a common manifold, a conduit extending from said manifold into the upper section of an enclosed condensing chamber, a cold water pipe extending laterally into the upper section of said condensing chamber at a level below the lower end of said last named conduit, a downwardly pointing nozzle in said pipe, a gaseous material withdrawal conduit extending from the lower section of said condensing chamber, a liquid withdrawal conduit extending from the bottom of said combining chamber, at least one conduit for contact material flow extending from each of said supply chambers downwardly a substantial distance into said regeneration chamber therebelow, the horizontal cross sectional area of each of said conduits being only a small fraction of the horizontal cross-sectional area of the supply chamber from which said conduit extends and said supply chambers being out of communication with said regeneration chamber except through said conduits, means for introducing air into said regeneration chamber, means for removing flue gas from said regeneration chamber and means for removing contact material from the lower section of said regeneration chamber.

11. An apparatus for the regeneration of used granular contact material wherein a bed of granular contact material is maintained within a confined supply chamber, said contact material in said bed containing a hydrocarbonaceous deposit and also having combustible vapors mixed therewith which comprises in combination: an enclosed regeneration chamber below said supply chamber adapted to contain a substantially compact column of contact material, means for supplying used contact material to said supply chamber, a conduit for the flow of combustible vapors extending from said supply chamber to a confined condensing chamber, means for reducing the pressure in said conduit below the pressure in said supply chamber, means for condensing at least a major portion of said combustible vapors in said condensing chamber, means defining at least one passageway for contact material flow from said supply chamber into said regeneration chamber therebelow, means for introducing an oxygen-containing gas into said regeneration chamber, means for removing flue gas from said regeneration chamber and means for removing regenerated contact material from the lower section of said regeneration chamber.

References Cited in the file of this patent

UNITED STATES PATENTS

| Number | Name | Date |
|---|---|---|
| 2,436,254 | Eastwood | Feb. 17, 1948 |
| 2,447,116 | Collins | Aug. 17, 1948 |
| 2,506,542 | Caldwell | May 2, 1950 |

UNITED STATES PATENT OFFICE

CERTIFICATE OF CORRECTION

Patent No. 2,695,266　　　　　　　　　　　　　　November 23, 1954

Robert D. Drew et al.

It is hereby certified that error appears in the printed specification of the above numbered patent requiring correction and that the said Letters Patent should read as corrected below.

Column 3, line 6, for "extended" read --extend--; column 4, line 26, for "below" read --above--; column 7, line 35, after "positioned" insert --next to the condensing chamber and a 6 inch pipe extended--.

Signed and sealed this 31st day of May 1955.

(SEAL)
Attest:

E. J. MURRY

Attesting Officer

ROBERT C. WATSON
Commissioner of Patents